(12) United States Patent
Matsuo et al.

(10) Patent No.: US 9,208,002 B2
(45) Date of Patent: Dec. 8, 2015

(54) EQUALIZING BANDWIDTH FOR MULTIPLE REQUESTERS USING A SHARED MEMORY SYSTEM

(75) Inventors: Hisato Matsuo, Yokohama (JP); Rika Nagahara, Yamato (JP); Scott Jeffrey Schaffer, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 13/344,941

(22) Filed: Jan. 6, 2012

(65) Prior Publication Data

US 2013/0179645 A1 Jul. 11, 2013

(51) Int. Cl.
*G06F 12/00* (2006.01)
*G06F 9/54* (2006.01)
*G06F 15/167* (2006.01)

(52) U.S. Cl.
CPC ............. *G06F 9/544* (2013.01); *G06F 12/00* (2013.01); *G06F 15/167* (2013.01)

(58) Field of Classification Search
CPC ...................................... G06F 12/00
USPC ........................................ 711/167
See application file for complete search history.

(56) References Cited

U.S. PATENT DOCUMENTS

| 5,072,420 | A | | 12/1991 | Conley et al. | |
|---|---|---|---|---|---|
| 5,241,632 | A | * | 8/1993 | O'Connell et al. | 710/117 |
| 5,507,005 | A | | 4/1996 | Kojima et al. | |
| 6,070,205 | A | | 5/2000 | Kato et al. | |
| 6,266,718 | B1 | | 7/2001 | Klein | |
| 6,532,507 | B1 | * | 3/2003 | Falik et al. | 710/107 |
| 7,062,582 | B1 | * | 6/2006 | Chowdhuri | 710/116 |
| 7,487,276 | B2 | * | 2/2009 | Nicholas | 710/118 |
| 2004/0006666 | A1 | * | 1/2004 | Moss | 711/5 |

(Continued)

FOREIGN PATENT DOCUMENTS

| JP | 02001222461 A | 8/2001 |
|---|---|---|
| JP | 2002312309 A | 10/2002 |
| JP | 2006099199 A | 4/2006 |

OTHER PUBLICATIONS

PCT, International Search Report and Written Opinion, International App. No. PCT/IB2012/057136, Apr. 16, 2013.

(Continued)

*Primary Examiner* — Sanjiv Shah
*Assistant Examiner* — Gautam Sain
(74) *Attorney, Agent, or Firm* — Nelson and Nelson; Daniel P. Nelson; Alexis V. Nelson (57) ABSTRACT

A method for equalizing the bandwidth of requesters using a shared memory system is disclosed. In one embodiment, such a method includes receiving multiple access requests to access a shared memory system. Each access request originates from a different requester coupled to the shared memory system. The method then determines which of the access requests has been waiting the longest to access the shared memory system. The access requests are then ordered so that the access request that has been waiting the longest is transmitted to the shared memory system after the other access requests. The requester associated with the longest-waiting access request may then transmit additional access requests to the shared memory system immediately after the longest-waiting access request has been transmitted. A corresponding apparatus and computer program product are also disclosed.

17 Claims, 5 Drawing Sheets

(56) References Cited

U.S. PATENT DOCUMENTS

| | | | |
|---|---|---|---|
| 2005/0132146 A1* | 6/2005 | Kim et al. | 711/151 |
| 2006/0004946 A1 | 1/2006 | Shah et al. | |
| 2007/0076511 A1 | 4/2007 | Choi | |
| 2008/0140980 A1* | 6/2008 | Mei et al. | 711/170 |
| 2009/0006165 A1* | 1/2009 | Teh et al. | 705/8 |
| 2011/0125946 A1 | 5/2011 | Demura et al. | |

OTHER PUBLICATIONS

Maierhofer, Martin, "Efficient Arbitration and Bridging Techniques for High-Performance Multimedia Servers", Report for Transfer of Registration from MPhil to PhD, University of Teesside, Feb. 1999.

JEDEC Standard, DDR3 SDRAM, JESD79-3C, JEDEC Solid State Technology Association, Nov. 2008.

* cited by examiner

EQUALIZING BANDWIDTH FOR MULTIPLE REQUESTERS USING A SHARED MEMORY SYSTEM

BACKGROUND

1. Field of the Invention

This invention relates to apparatus and methods for equalizing the bandwidth of multiple requesters utilizing a shared memory system.

2. Background of the Invention

Power consumption and cost reduction are key issues for storage devices such as tape drives. A typical storage device such as a tape drive is equipped with multiple processors that interface with external memory devices. In certain cases, the multiple processors share an external DRAM so that the number of DRAM chips can be reduced. Reducing the number of DRAM chips helps to reduce power consumption, cost, and the footprint of the circuit board. However, when using a shared memory system, storage device performance may be affected in two ways. First, the memory access turnaround times for the processors may be negatively affected. Second, memory sharing may provide unequal bandwidth to the processors.

When an access request from a processor is transmitted to an external DRAM, the turnaround time of the access request depends at least partly on the DRAM's protocol overhead. If a second access request is received from a second processor while the first access request is in process, the second processor must wait for the processing of the first access request to finish before processing of the second access request can begin. This increases the turnaround time for the second processor. In order to improve turnaround times in a shared memory system (such as a shared DDR3 SDRAM system), two different operating modes may be used—bank interleave mode (also referred to herein as "BI mode") and continuous read/write mode (also referred to herein as "CN mode").

When operating in BI mode, multiple banks of a DRAM may be open at the same time. A controller can send access requests to the multiple open banks in an interleaved manner without having to reopen the banks, thereby reducing turnaround times. Operation in CN mode allows a controller to submit multiple access requests (e.g., read and/or write commands) to the same bank and row as a previous access request without having to reopen the bank and row, thereby reducing overhead and improving turnaround times. Both the BI mode and CN mode improve DRAM bus efficiency, which in turn lowers the required clock frequency and power consumed.

Unlike personal computer or server systems, multiple processors in storage devices such as tape drives devices are not always intended to be used symmetrically. One processor may be designated as a primary processor while other processors are designated as secondary to or slaves of the primary processor. Secondary processors, for example, may perform ancillary tasks such as servo system and host interface tasks. As a result, an arbitration scheme is needed that provides priority to access requests from a primary processor.

However, giving priority to access requests from a primary processor can cause performance problems. For example, during a normal transfer (non-BI-mode transfer) where multiple access requests are received from multiple processors, the access request for the primary processor may be transferred to the shared memory system first. The access requests for the other non-primary processors may then be transferred to the shared memory system. The processor associated with the last access request (which may be a lower priority processor) may be allowed to operate in CN mode, which allows the processor to send multiple access requests with consecutive addresses to the shared memory system. This provides additional bandwidth to the last processor in the sequence. Unfortunately, this may also reduce the bandwidth of the primary processor or other processors, as well as increase their turnaround times.

In view of the foregoing, what are needed are apparatus and methods to equalize the bandwidth provided to multiple processors (or other requesters) submitting access requests to a shared memory system. Ideally, such apparatus and methods will equalize the average turnaround times for each of the processors (or other requesters) accessing the shared memory system.

SUMMARY

The invention has been developed in response to the present state of the art and, in particular, in response to the problems and needs in the art that have not yet been fully solved by currently available apparatus and methods. Accordingly, the invention has been developed to substantially equalize the bandwidth of multiple requesters accessing a shared memory system. The features and advantages of the invention will become more fully apparent from the following description and appended claims, or may be learned by practice of the invention as set forth hereinafter.

Consistent with the foregoing, a method for equalizing the bandwidth of requesters using a shared memory system is disclosed herein. In one embodiment, such a method includes receiving multiple access requests to access a shared memory system. Each access request originates from a different requester coupled to the shared memory system. The method then determines which of the access requests has been waiting the longest to access the shared memory system. The access requests are then ordered so that the access request that has been waiting the longest (also referred to herein as the "longest-waiting access request") is transmitted to the shared memory system after the other access requests. The requester associated with the longest-waiting access request may then transmit additional access requests to the shared memory system immediately after the longest-waiting access request has been transmitted.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may be implemented as a hardware embodiment, a software embodiment (including firmware, resident software, microcode, etc.) configured to operate hardware, or an embodiment combining both software and hardware elements. Each of these embodiments may be represented by one or more modules or blocks. Furthermore, the present invention may be implemented in a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example, but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the C programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
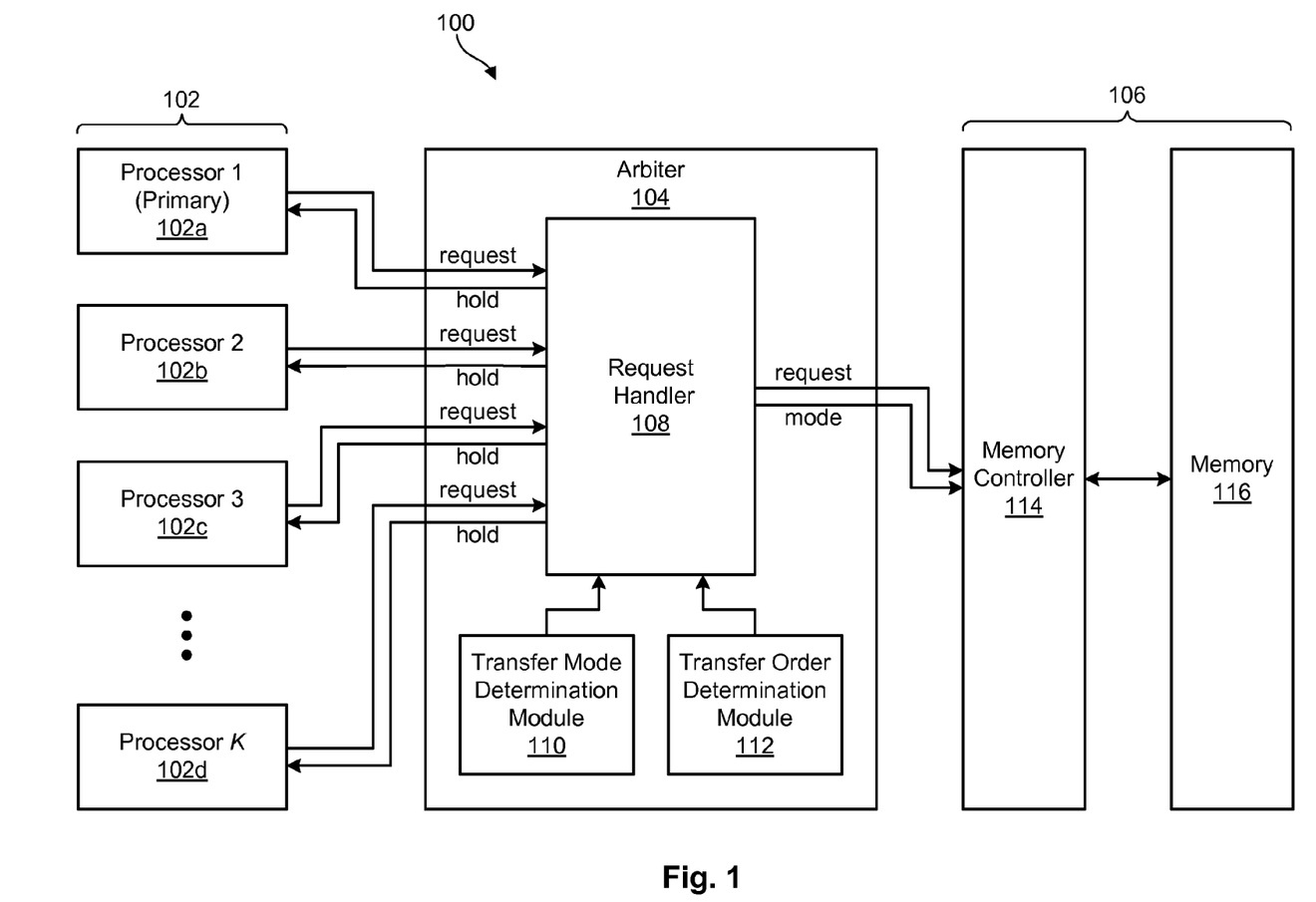
FIG. 1 is a high-level block diagram showing an example of a system comprising multiple processors, an arbiter, and a shared memory system.

Referring to FIG. 1, a high-level block diagram showing an example of a system 100 comprising multiple processors 102, an arbiter 104, and a shared memory system 106 is illustrated. As shown, the processors 102 include a primary processor 102a and one or more secondary or slave processors 102b-d. The processors 102 generate access requests to read or write data or instructions in the shared memory system 106.

As shown, the processors 102 interface with an arbiter 104. A request handler 108 inside the arbiter 104 may receive access requests from the processors 102 and transfer the access requests in some designated sequence to the shared memory system 106. In general, when the request handler 108 receives a first access request from a processor 102, the request handler 108 holds the next (second) access request from the processor 102 (as indicated by the "hold" signals illustrated in FIG. 1). When the request handler 108 transfers the first access request to the shared memory system 106, the request handler 108 releases the hold and receives the next (second) access request from the processor 102.

As will be explained in more detail in association with FIGS. 3 and 5, the request handler 108 submits the access requests to the shared memory system 106 in a way that equalizes, as much as possible, the bandwidth allocated to each of the processors 102. For the purposes of this disclosure, the term "bandwidth" is used to describe the time and/or resources allocated to processing the access requests generated by each of the processors 102.

In order to reduce protocol overhead and improve memory bus efficiency, the arbiter 104 may include a transfer mode determination module 110. More specifically, the transfer mode determination module 110 determines the most efficient transfer mode (e.g., BI mode, CN mode, etc.) and instructs the request handler 108 to use the determined transfer mode. For example, if access requests from different processors 102 are directed to different banks of the memory 116, the transfer mode determination module 110 may instruct the request handler 108 to transmit the access requests in BI mode. On the other hand, if an access request is the last access request in a transfer cycle and the processor 102 associated with the access request has additional access requests directed to the same bank and row in the memory 116, the transfer mode determination module 110 may instruct the request handler 108 to operate in CN mode. The request handler 108 may then transfer the access requests to the shared memory system 106 in accordance with the determined transfer mode.

A transfer order determination module 112 may be used to determine the order (i.e., sequence) in which access requests are transmitted from the arbiter 104 to the shared memory system 106. In general, this may be performed with the objective to equalize, or at least even out, the bandwidth for each of the processors 102. This will ensure that a primary processor 102a or other processor 102 is not inadvertently starved or provided a reduced bandwidth compared to other processors 102.

As shown, the shared memory system 106 includes a memory controller 114 (e.g., a DRAM controller 114) and a memory 116 (e.g., one or more DRAM chips 116). The memory controller 114 may manage the flow of data going to and from the memory 116. As shown, the request handler 108 transmits access requests to the memory controller 114 along with the transfer mode to use when reading and/or writing to the memory 116.

It should be recognized that the arbiter 104 may be used to arbitrate access requests from requesters other than processors 102. For the purpose of this disclosure, a "requester" is deemed to be any system, device, or module that is capable of generating access requests to access a shared memory system 106. A processor 102 is simply one type of requester. The arbiter 104 may arbitrate the access requests of exclusively processors 102, exclusively non-processor requesters, or a mixture of both processors 102 and non-processor requesters.

Figure 2:
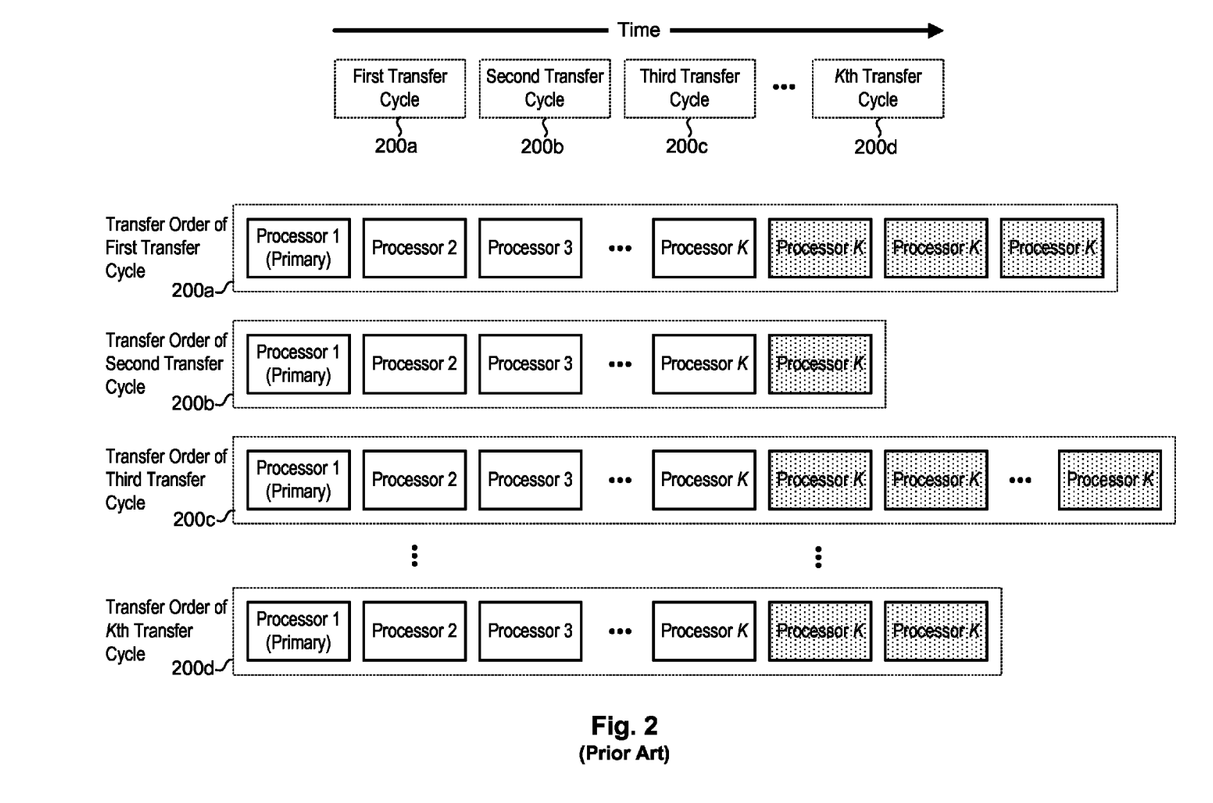
FIG. 2 is a timing diagram showing how access requests of multiple processors are ordered by a conventional arbiter during a normal transfer (non-BI-mode transfer)

Referring to FIG. 2, a timing diagram showing how access requests of multiple processors are processed by a conventional arbiter during a normal transfer (non-BI-mode transfer) is illustrated. As shown, the transfers are divided into multiple "transfer cycles" 200. During a transfer cycle 200, the arbiter 104 receives access requests from one or more processors 102 and sequentially transfers the access requests to the shared memory system 106. As shown, the access request of the primary processor 102a is given priority. Thus, during a first transfer cycle 200a, the access request associated with the primary processor 102a is transferred first followed by the access requests of the other processors 102.

In the event one or more processors 102 have additional access requests directed to the same bank and row of the memory 116, only the processor 102 associated with the last access request (i.e., "processor K") is allowed to continuously transfer additional access requests (represented by the shaded boxes) in continuous mode (i.e., CN mode). Thus, as shown in FIG. 2, multiple access requests may be transferred to the shared memory system 106 for Processor K. This provides additional bandwidth to the processor 102 associated with the last access request (since it is able to transfer multiple access requests) but has the undesired effect of starving the primary processor 102a as well as other processors 102, which are unable to transfer additional access requests until the access requests for the last processor 102 are transferred. That is, the primary processor 102a and other processors 102 have to wait for all of the access requests associated with Processor K to complete before they can send their next access requests. The same problem repeats itself as additional transfer cycles 200b, 200c, 200d are executed, as illustrated in FIG. 2.

Figure 3:
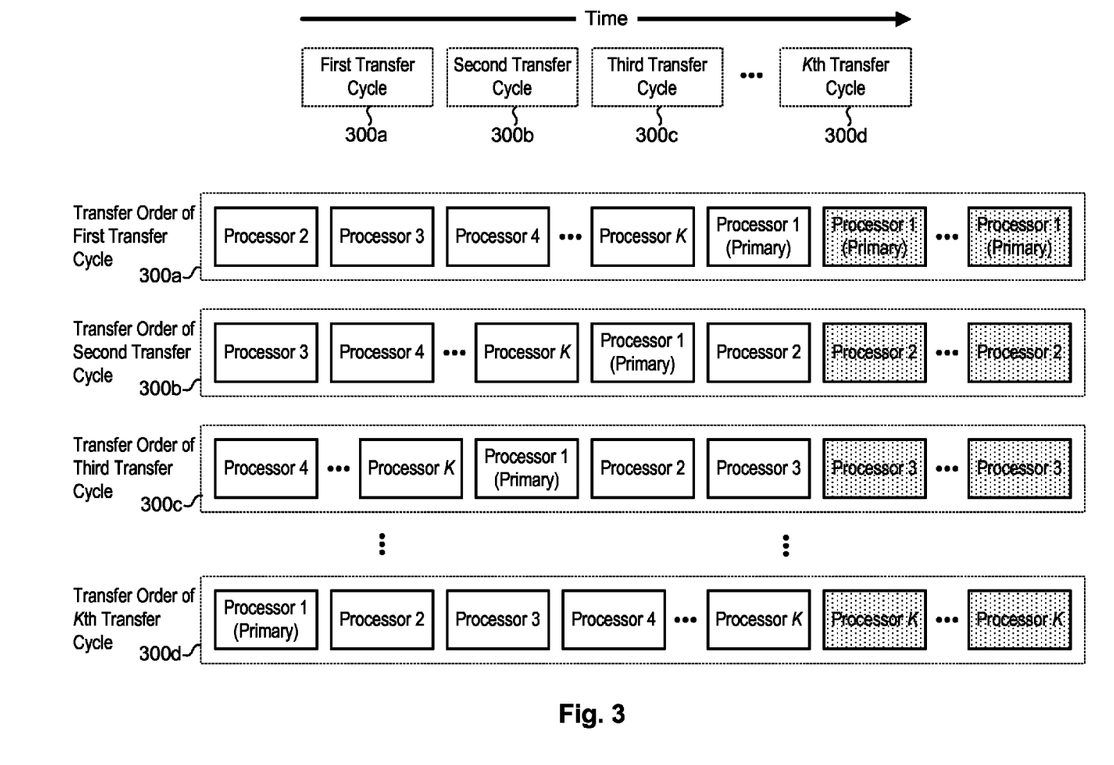
FIG. 3 is a timing diagram showing how access requests of multiple processors are ordered by an improved arbiter in accordance with the invention during a normal transfer.

Referring to FIG. 3, a timing diagram showing how access requests of multiple processors 102 are processed by an improved arbiter 104 in accordance with the invention is illustrated. During a transfer cycle 300, the arbiter 104 receives access requests from one or more processors 102, determines a transfer mode and transfer order, and sequentially transfers the access requests to the shared memory system 106 in accordance with the determined transfer mode and transfer order. As shown, the transfer order is modified such that the access request that has been waiting the longest (also referred to herein as the "longest-waiting access request") is transferred to the shared memory system 106 after the other access requests. This allows the processor 102 associated with the longest-waiting access request to transfer additional access requests in continuous (CN) mode. As shown in FIG. 3, modifying the transfer protocol in this manner allows the access requests for each of the processors 102 to alternately go last in the transfer order. This equalizes, or at least somewhat evens out, the bandwidth of each of the processors 102.

For example, FIG. 3 assumes that the arbiter 104 receives an access request from each of the processors 102 at substantially the same time. As shown, the arbiter 104 transfers the access request associated with the primary processor 102a last in the transfer order (in order to give the primary processor 102a priority over the other processors 102), as shown in the first transfer cycle 300a. This allows the primary processor 102a (i.e., Processor 1) to transfer additional access requests in CN mode, as shown by the shaded boxes in the first transfer cycle 300a.

Because the access request associated with Processor 2 was transferred to the shared memory system 106 first in the first transfer cycle 300a, the next access request associated with Processor 2 will have been waiting the longest when the second transfer cycle 300b begins. Thus, in the second transfer cycle 300b, the access request associated with Processor 2 is transferred last in the transfer order. This allows Processor 2 to transfer additional access requests in CN mode, as shown by the shaded boxes in the second transfer cycle 300b.

Similarly, because the access request associated with Processor 3 was transferred first in the second transfer cycle 300b, the next access request associated with Processor 3 will have been waiting the longest when the third transfer cycle 300c begins. Thus, in the third transfer cycle 300c, the access request associated with Processor 3 is transferred last in the transfer order. This allows Processor 3 to transfer additional access requests in CN mode, as shown by the shaded boxes in the third transfer cycle 300c.

This process continues for additional transfer cycles 300, thereby allowing each processor 102 to be last in the transfer order. This, in turn, substantially equalizes bandwidth between the processors 102 by giving each processor 102 the opportunity to transmit access requests in CN mode. It also substantially equalizes the average turnaround time for each of the processors 102. Eventually, the process repeats and the primary processor 102a is once again able to transfer last in the transfer order.

In certain embodiments in accordance with the invention, the number of additional access requests transferred to the shared memory system 106 by a processor 102 operating in CN mode in a given transfer cycle 300 is limited to a specified number. This will ensure that certain processors 102 do not consume too much bandwidth, to the detriment of other processors 102. This will also help to ensure that turnaround times for access requests do not exceed acceptable limits. The specified number may be a set number, a variable number established by algorithms or other criteria, a user-configurable number, or the like.

Figure 4:
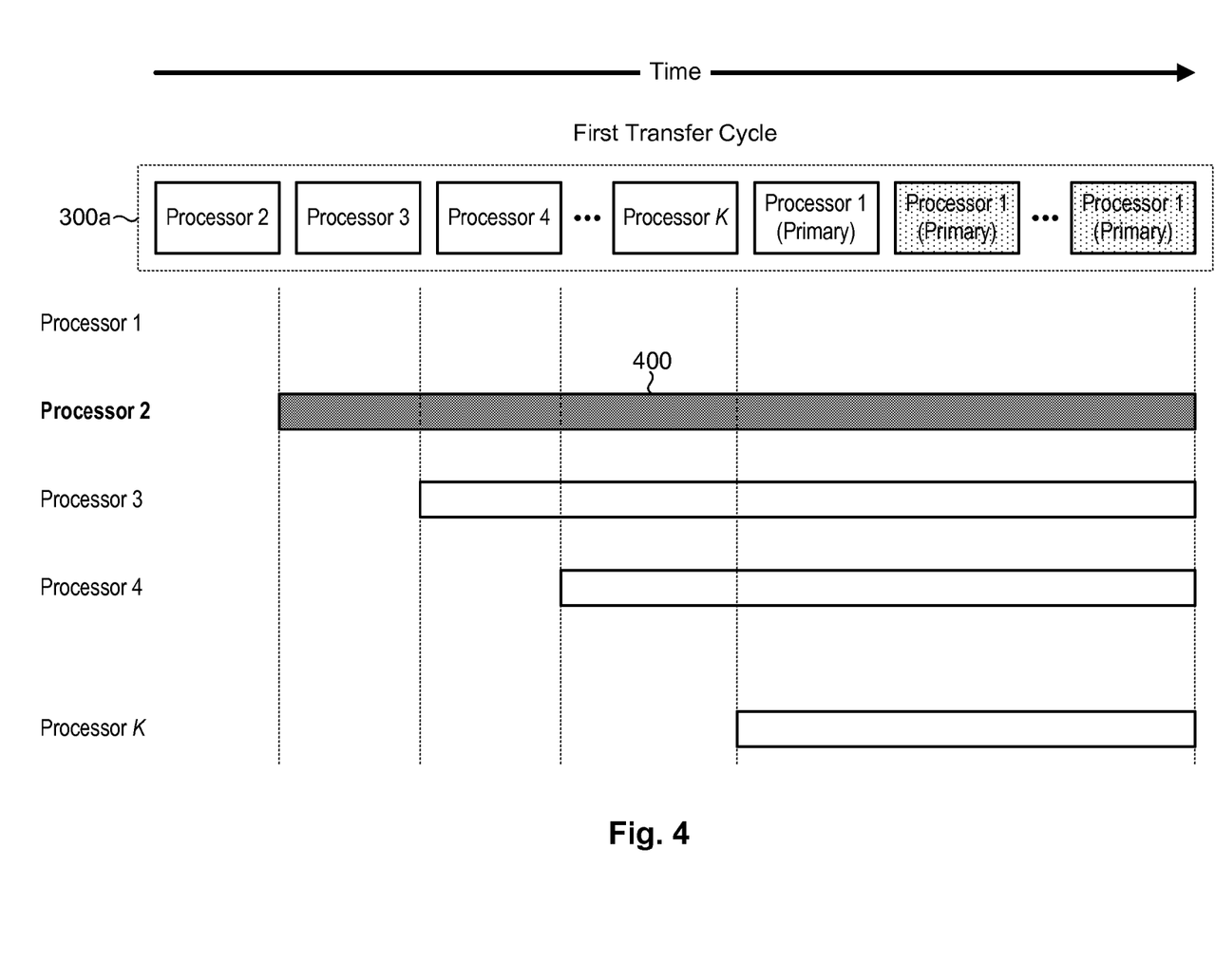
FIG. 4 is a timing diagram providing an example of access request wait times for multiple processors.

Referring to FIG. 4, a timing diagram showing access request wait times for multiple processors 102 is illustrated. This timing diagram shows the wait times of processors 102 during the first transfer cycle 300a illustrated in FIG. 3. As shown in FIG. 4, during the first transfer cycle 300a, the access request associated with Processor 2 is transferred to the shared memory system 106 first in the transfer order. Once this occurs, a counter keeps track of the amount of time Processor 2 has to wait before it is able to transmit its next access request. The same thing occurs with each of the other processors 102. That is, after an access request is transferred for each processor 102, a counter keeps track of the amount of time that has elapsed before each processor 102 is able to transfer its next access request.

As shown in FIG. 4, when the second transfer cycle 300b begins, Processor 2 will have the access request with the longest wait time (as shown by the shaded bar 400) since the access request associated with Processor 2 was the first to be transferred during the first transfer cycle 300a. Thus, during the second transfer cycle 300b, the access request associated with Processor 2 will be transferred last in the transfer order. This will allow Processor 2 to transfer additional access requests in CN mode.

Figure 5:
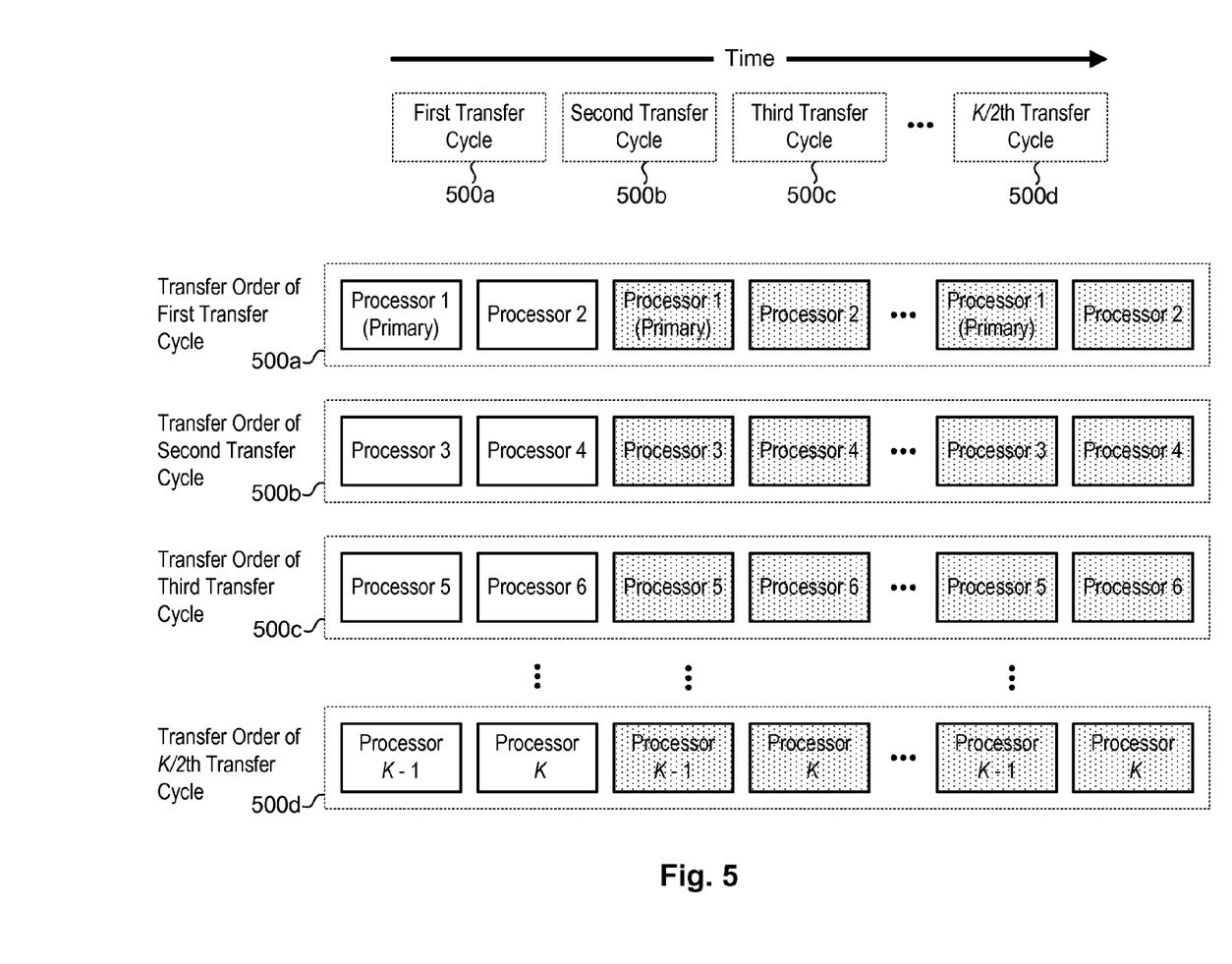
FIG. 5 is a timing diagram showing how access requests of multiple processors are processed by an improved arbiter in accordance with the invention when operating in BI mode.

Referring to FIG. 5, a timing diagram showing how access requests of multiple processors 102 are ordered by an improved arbiter 104 in accordance with the invention when operating in BI mode is illustrated. The following description assumes that the requests received from the processors 102 can be transferred in bank-interleave (BI) mode (i.e., the access requests are directed to different banks of the memory 116) and that the number of banks in the memory 116 is two. In reality, the memory 116 may have more than two banks and may be able to execute interleaved accesses to the maximum number of banks that are allowed to be open at any one time. When transferring the access requests in BI mode, the transfer cycles 500 change considerably from those used during a normal transfer.

FIG. 5 assumes that all access requests received from the processors 102 have the same wait time. In such a case, Processor 1 is selected to be the first requester in the first transfer cycle 500a since it is the primary processor 102a. Any of the other processors 102 may be selected to be second in the transfer order as long as they access a different bank of memory 116 than Processor 1. In this case, Processor 2 is selected to be the second requester, which relies on the assumption that the access requests from Processor 1 and Processor 2 are directed to different banks in the memory 116. Thus, the access requests from Processors 1 and 2 are transferred in a first transfer cycle 500a in BI mode.

Assuming that Processor 1 and Processor 2 have additional access requests directed to the same bank and row of memory 116 as their initial access requests, Processors 1 and 2 may then submit additional access requests in CN mode, as shown by the shaded boxes. In certain embodiments, the number of additional access requests transferred by Processors 1 or 2 may be limited to a specified number in order not to starve other processors 102, as previously discussed. In the illustrated embodiment, the access requests submitted to the shared memory system 106 for Processor 1 and Processor 2 alternate, although this would not necessarily be the case in real-world scenarios. The additional access requests would likely be transferred to the shared memory system 106 in the order they are received by the arbiter 104.

In the second or later transfer cycles 500b-d, the access requests may be sorted by wait time in descending order. Since Processors 3 and 4 have a wait time greater than Processors 1 and 2, Processors 3 and 4 may transfer their access requests in the second transfer cycle 500b, assuming that the access requests from Processors 3 and 4 are directed to different banks in the memory 116. Once the access requests for Processors 3 and 4 are transferred, Processors 3 and 4 may continue to submit access requests to their respective banks in CN mode assuming that they have additional access requests which are directed to the same banks and rows in memory 116. Additional transfer cycles 500 may be performed for the other processors 102, in the method described above, as shown in FIG. 5.

The flowcharts and/or block diagrams in the Figures illustrate the architecture, functionality, and operation of possible implementations of systems, methods, and computer-usable storage media according to various embodiments of the present invention. In this regard, each block in the flowcharts and/or block diagrams may represent a module, segment, or portion of code, which comprises one or more executable instructions for implementing the specified logical function (s). It should also be noted that, in some alternative implementations, the functions noted in a block may occur in a different order than that illustrated in the Figures. For example, two blocks shown in succession may, in fact, be implemented in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for equalizing the bandwidth of requesters using a shared memory system, the method comprising:
   receiving a plurality of access requests to access a shared memory system, each access request originating from a different requester coupled to the shared memory system, the plurality of access requests associated with a single transfer cycle;
   determining which of the access requests has been waiting the longest to access the shared memory system;
   ordering, during the single transfer cycle, the access requests such that the access request that has been waiting the longest (hereinafter the "longest-waiting access request") is transmitted to the shared memory system after the other access requests; and
   enabling, during the single transfer cycle, the requester associated with the longest-waiting access request to continuously transmit additional access requests to the shared memory system immediately after the longest-waiting access request has been transmitted, such that during the single transfer cycle the requester associated with the longest-waiting access request is permitted to transmit multiple access requests to the shared memory system while all other requesters are only permitted to transmit a single access request to the shared memory system.

2. The method of claim 1, wherein transmitting additional access requests comprises transmitting additional access requests up to a specified number.

3. The method of claim 2, wherein the specified number is a user-configurable number.

4. The method of claim 1, wherein ordering the access requests comprises ordering the access requests, other than the longest-waiting access request, from longest waiting time to shortest waiting time for transmission to the shared memory system.

5. The method of claim 1, wherein transmitting additional access requests comprises transmitting additional access requests that are directed to a same bank and row as the longest-waiting access request.

6. The method of claim 1, further comprising, in the event all of the access requests have been waiting the same amount of time, transmitting the access request associated with a primary requester to the shared memory system after the other access requests.

7. An apparatus for equalizing the bandwidth of requesters using a shared memory system, the apparatus comprising:
   an arbiter to receive a plurality of access requests to access a shared memory system, each access request originating from a different requester coupled to the shared memory system, the plurality of access requests associated with a single transfer cycle;
   the arbiter further configured to determine which of the access requests has been waiting the longest to access the shared memory system;
   the arbiter further configured to order, during the single transfer cycle, the access requests such that the access request that has been waiting the longest (hereinafter the "longest-waiting access request") is transmitted to the shared memory system after the other access requests; and
   the arbiter further configured to enable, during the single transfer cycle, the requester associated with the longest-waiting access request to continuously transmit additional access requests to the shared memory system immediately after the longest-waiting access request has been transmitted, such that during the single transfer cycle the requester associated with the longest-waiting access request is permitted to transmit multiple access requests to the shared memory system while all other requesters are only permitted to transmit a single access request to the shared memory system.

8. The apparatus of claim 7, wherein the arbiter only transmits additional access requests up to a specified number.

9. The apparatus of claim 8, wherein the specified number is a user-configurable number.

10. The apparatus of claim 7, wherein the arbiter is configured to order the access requests, other than the longest-waiting access request, from longest waiting time to shortest waiting time for transmission to the shared memory system.

11. The apparatus of claim 7, wherein the additional access requests are additional access requests with consecutive addresses.

12. The apparatus of claim 7, wherein the arbiter is further configured to, in the event all of the access requests have been waiting the same amount of time, transmit the access request associated with a primary requester to the shared memory system after the other access requests have been transmitted.

13. A computer-program product for equalizing the bandwidth of requesters using a shared memory system, the computer-program product comprising a non-transitory computer-readable storage medium having computer-usable program code stored therein, the computer-usable program code comprising:
   computer-usable program code to receive a plurality of access requests to access a shared memory system, each access request originating from a different requester coupled to the shared memory system, the plurality of access requests associated with a single transfer cycle;
   computer-usable program code to determine which of the access requests has been waiting the longest to access the shared memory system;
   computer-usable program code to order, during the single transfer cycle, the access requests such that the access request that has been waiting the longest (hereinafter the "longest-waiting access request") is transmitted to the shared memory system after the other access requests; and
   computer-usable program code to enable, during the single transfer cycle, the requester associated with the longest-waiting access request to continuously transmit additional access requests to the shared memory system immediately after the longest-waiting access request has been transmitted, such that during the single transfer cycle the requester associated with the longest-waiting access request is permitted to transmit multiple access requests to the shared memory system while all other requesters are only permitted to transmit a single access request to the shared memory system.

14. The computer-program product of claim 13, wherein transmitting additional access requests comprises transmitting additional access requests up to a specified number.

15. The computer-program product of claim 13, wherein ordering the access requests comprises ordering the access requests, other than the longest-waiting access request, from longest waiting time to shortest waiting time for transmission to the shared memory system.

16. The computer-program product of claim 13, wherein transmitting additional access requests comprises transmitting additional access requests that have consecutive addresses.

17. The computer-program product of claim 13, further comprising computer-usable program code to, in the event all of the access requests have been waiting the same amount of time, transmit the access request associated with a primary requester to the shared memory system after the other access requests.

* * * * *